July 18, 1944.  E. S. HINELINE  2,353,894
COPYING CAMERA UNIT
Original Filed April 10, 1940   4 Sheets-Sheet 1
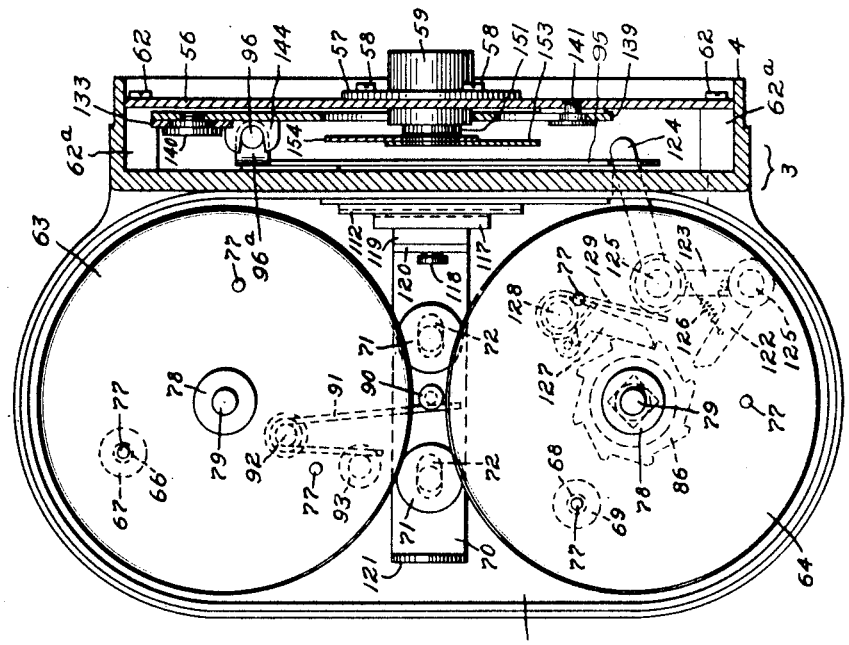
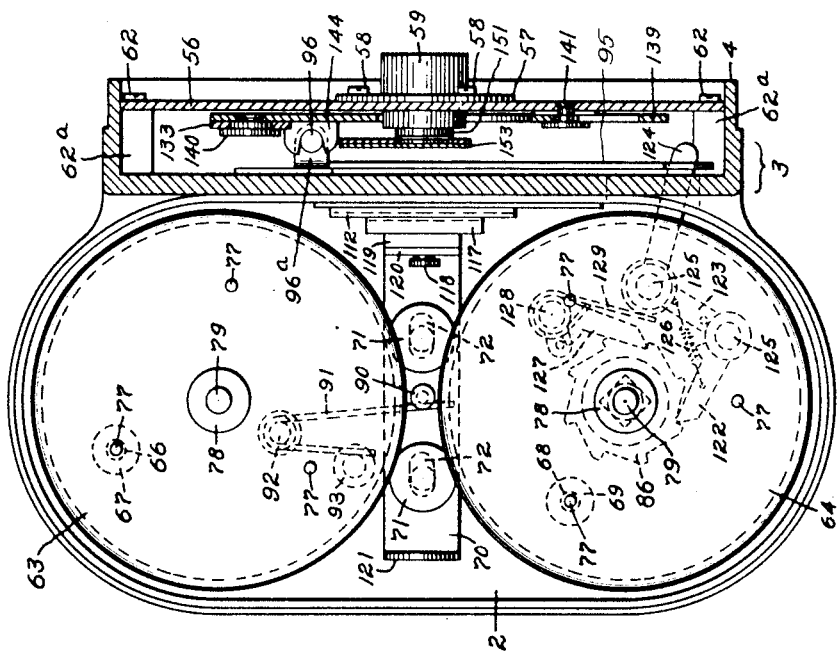
Inventor:
Edson S. Hineline,
Attys.

July 18, 1944. E. S. HINELINE 2,353,894
COPYING CAMERA UNIT
Original Filed April 10, 1940 4 Sheets-Sheet 2

Inventor:
Edson S. Hineline.
By Emery, Booth, Townsend, Miller & Vaughan
Attys.

July 18, 1944.  E. S. HINELINE  2,353,894
COPYING CAMERA UNIT
Original Filed April 10, 1940  4 Sheets-Sheet 3

Inventor:
Edson S. Hineline.
by Emery, Booth, ...
Attys.

July 18, 1944.  E. S. HINELINE  2,353,894
COPYING CAMERA UNIT
Original Filed April 10, 1940  4 Sheets-Sheet 4
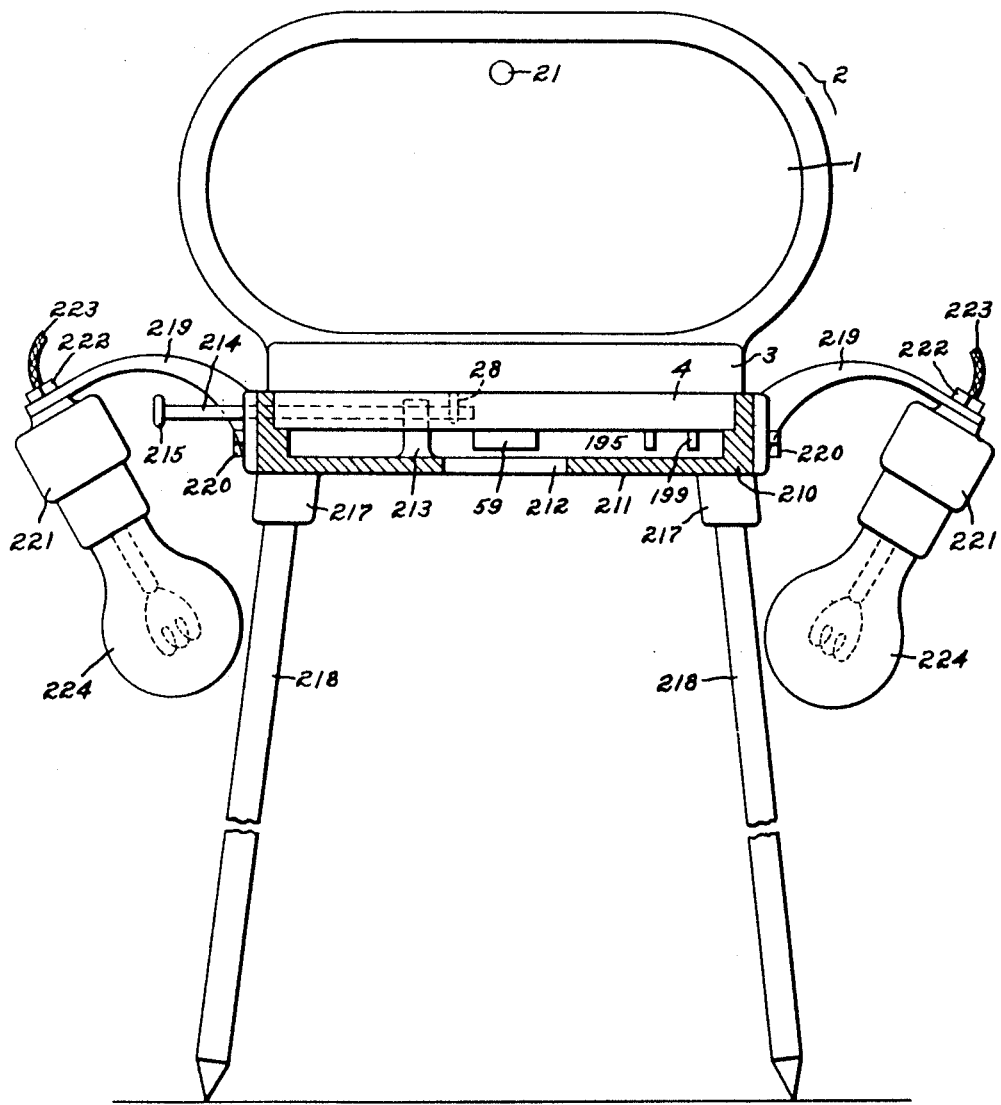
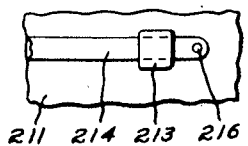
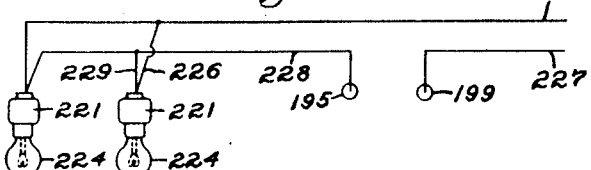
Inventor:
Edson S. Hineline, Patented July 18, 1944

2,353,894

UNITED STATES PATENT OFFICE 2,353,894

COPYING CAMERA UNIT

Edson S. Hineline, Rochester, N. Y., assignor to The Folmer Graflex Corporation, Rochester, N. Y., a corporation of Delaware Original application April 10, 1940, Serial No. 328,868. Divided and this application June 19, 1943, Serial No. 491,495

8 Claims. (Cl. 88—24)

This application is a division of my co-pending application Ser. No. 328,868, filed April 10, 1940.

This invention relates to a copying camera unit, particularly intended for photographing records, such as letters, pages of books, labels on packages, etc., positioned beneath and at a suitable distance from the downwardly directed lens barrel of the camera placed upon a suitable camera support which is provided with camera operating means.

In order that the principle of the invention may be readily understood, I have disclosed a single embodiment thereof in the accompanying drawings, wherein—

Fig. 1 is a partial longitudinal section through the camera, showing the take-off and take-up magazines in place, the take-up mechanism being shown in dotted lines, and the shutter release lever being shown as moved all the way down, the hood-like part being omitted, which part is employed when the camera is used to make photorecords of meters, registers and the like;

Fig. 2 is a view similar to Fig. 1, but showing the shutter release lever as having been released, thus advancing the film, the shutter being at rest;

Fig. 9 is a side elevation, partly in vertical section of the selected embodiment of my invention, showing the relation of the camera and camera supporting means, and illuminating means for the object to be photographed;

Fig. 10 is a fragmentary detail of the operating lever, showing the supporting means therefor, and the hole in the operating lever for receiving the operating pin; and Fig. 11 is a circuit diagram, showing the connections between the electrical supply, the electric lamps and the contact-connecting means to the switch within the camera structure.

I do not herein show that use of the camera disclosed in my said parent application Ser. No. 328,868, for photorecording data upon objects, such as telephone exchange meters, electric meters, gas meters, etc., having dimensions corresponding with or that may be received within the opening or rim of a hood-like part employed only in photorecording, and accordingly I have omitted from the drawings the hood-like part which, for the purposes of photorecording, is removably attached to the rim of the mechanism-housing hereinafter described. However, I will as briefly as possible make necessary reference to the use of the camera for photorecording.

In Patent No. 1,963,095, issued June 19, 1934, and in Patent No. 2,034,441, issued March 17, 1936, to myself and William H. Petit as joint inventors, there is disclosed an automatic film camera or so-called Factograph camera which is motor driven and is particularly constructed for making successive exposures with great rapidity, one after another, of objects closely positioned with respect to each other, as, for example, the readings of meters in telephone exchanges. The camera shown in said patents is particularly adapted to be operated by an external electrical current to which the camera might readily be plugged, in a manner fully described in said patents, the camera containing a motor electrically driven from said externally derived current, by which motor the film was fed and the shutter was operated.

The camera herein disclosed is provided with means for feeding the film and operating the shutter, and contains contacting or circuiting means to the illuminating means for providing the necessary illumination when the exposure is made, all under the control of a single manually-operated part.

To that end, the camera unit is provided with an illuminating system and with means for advancing the film automatically after each exposure is made, the camera having a film container readily insertable into and readily removable from the camera so that daylight loading can readily be accomplished, or from which film container any amount of film can be removed manually by the operator while the container is in the camera and without disturbing the film supply. The camera has a shutter of simple operation that is wholly automatic and which is provided with means for automatically timing the length of the period of shutter opening between wide limits, and the camera is provided with means to control the illumination for exposure purposes from and simultaneously with the shutter operation which is itself conjointly controlled by a single operating means, together with the feeding of the film. These and other features of the invention will be readily apparent from the following description of the selected embodiment thereof, but to which my invention is not specially limited.

Figure 3:
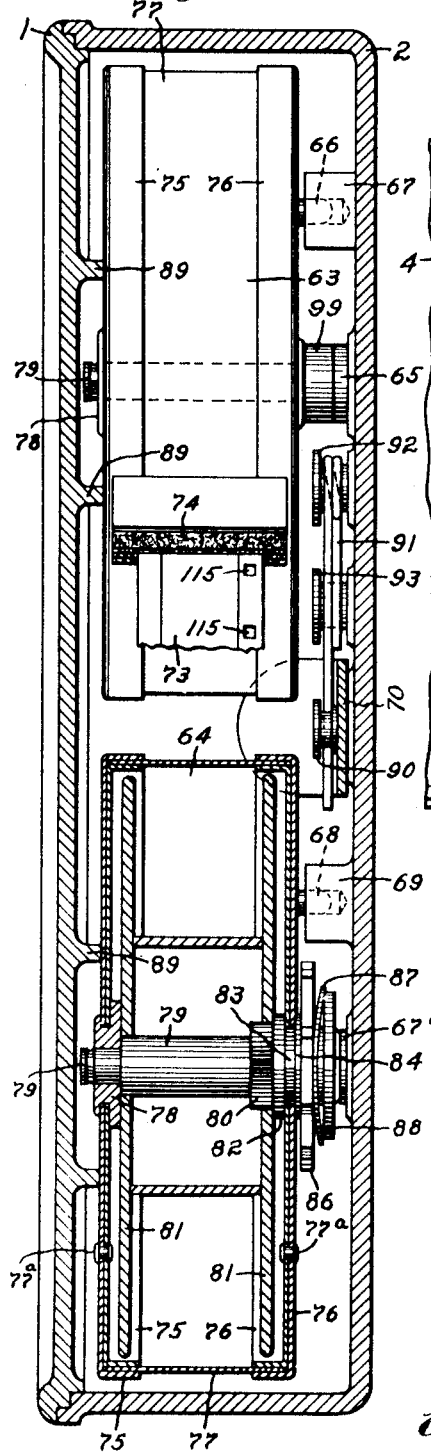
Fig. 3 is a transverse section through the magazine housing, showing the position of the take-off magazine and the take-up magazine, the latter being shown in section.

The camera casing is best indicated in Figs. 1, 2 and 3. Therefrom it will be evident that the camera casing is in part of box-like form including the body part and the cover part of such box-like portion, both of approximately elliptical, disk-like form, which body part (hereinafter more fully described) is provided with a rectangular rim projecting from and integral with one member of the magazine-receiving part of the casing. The said elliptical portion of the structure is of sufficient thickness between the walls of the two parts thereof (namely, the body part and the cover part) to receive the magazine containing the unexposed film and the magazine to receive the exposed portion of the film therefrom, sufficient space being afforded in advance of said two magazines within said rim to receive the film operating means and the shutter and its operating means. For that purpose the housing of the magazine proper of the camera is composed of a flat member 1 (Figs. 1 and 3) constituting the magazine door or cover, and a mating receptacle-part 2 receiving both of the magazines, and from an edge of which part 2 integrally projects a mechanism-housing part 3 having an outer rectangular rim 4 (best shown in Figs. 1, 2, 4, 9), to which, when employed, is attached said hook-like part (not shown).

The member 1 provides a magazine door furnished with a suitable latch. When the hood-like part is employed, there is mounted thereon a shutter-operating and film-feeding lever to operate all the functioning parts and having connected thereto a second lever operating a pin 28, shown in Figs. 5 and 6 and indicated in Fig. 9 as connected to the shutter operating means, which will be subsequently described.

The part 2 of the camera casing constitutes the support for the operating mechanism within a part projecting therefrom. The hood-like structure, used when photo-recording, is very readily removed when the camera is to be used in the manner indicated in Fig. 9.

Having thus described the more general features of the camera housing, including the magazine portion, reference will be made to Figs. 1, 2 and 3, wherein are sufficiently shown the means for supporting the take-off magazine and the take-up magazine for the film, which is preferably, though not necessarily, a standard perforated film without a leading or a trailer end. My invention is not, however, limited to the use of such film.

The camera is provided with a shutter plate 56 which is secured fixedly in position within and to the mechanism-housing part 3 of the camera casing, as indicated in Figs. 1 and 2. It is shown separately in Figs. 5 and 6. The said shutter plate 56 has attached thereto the lens flange 57 (Figs. 1 and 2) by means of screws 58, 58. Into the lens flange 57 is screwed or otherwise secured a lens barrel 59. The said shutter plate 56 is provided, as shown dotted in Figs. 5 and 6, with a narrow vertical slot 60 to permit the vertical operating movement of the pin 28, previously referred to as operated by movement of a hand-operated lever which, when the camera is used for photo-recording and the hood is provided, is mounted on said hood, but when the camera is used as a copying camera, the pin 28 is operated by a manually manipulable part 214 mounted in the camera-support, as shown in Fig. 9 and hereinafter described in detail. The said shutter plate 56 is also provided with a suitable number of holes 61 to receive screws for attaching the said shutter plate 56 within the mechanism-housing 3 of the framing or housing of the camera.

The magazine-receiving portion of the camera is of box-like form including the body part and cover part thereof, both body part and cover part being of approximately elliptical disk-like form, said body part being of just sufficient thickness to receive the film take-off and take-up magazines, as best appears from Figs. 1 and 2, wherein forward of the two magazines and integral with the part 2 thereof is the part of the camera casing which I term the mechanism-housing and which is indicated at 3 in Figs. 1 and 2. Within the same is supported the film-operating means and protruding through the front thereof is the lens 59 already referred to. From the said Figs. 1 and 2 the hood-like part of the structure has been omitted or removed.

The said shutter plate 56 is attached to the magazine-housing 3 by means of screws 62, 62 passing through suitable holes, which screws are threaded into the bosses 62a, 62a. The relative positions of the take-off or feed magazine and the take-up magazine are clearly evident from Figs. 1 and 2. The take-off or feed magazine is indicated at 63 and the take-up magazine at 64. The receptacle part 2 of the said magazine structure 1, 2 is provided with the pin 65 (best shown in Fig. 3) and on which is mounted the feed magazine 63, which is provided with a dowel 66 engaging a boss 67, best shown in dotted lines in Figs. 1 and 2. The said take-up magazine 64 is mounted on the pin 67a which is attached to the receptacle part 2. The said take-up magazine 64 is held in position by means of a dowel 68 engaging a boss 69 (shown in dotted lines in Figs. 1 and 2 and in full lines in Fig. 3). Attached to the receptacle part 2 and located between the said magazines 63 and 64, is a presser plate bar 70 (best shown in Figs. 1 and 2). The said presser plate bar 70 is secured to the said receptacle part 2 by means of shoulder screws 71, 71. The said bar 70 is provided with slots 72, 72.

Referring again to Fig. 3, the take-off magazine and the take-up magazine 63, 64 are shown as supported upon the pins, bosses and dowels already referred to, and the sensitized film 73 is represented in Fig. 3 as being fed through a suitable light trap 74 of the magazine 64. Both of the said magazines 63 and 64 are represented in Fig. 3 as each made up of two sets of concentric cups 75, 75 and 76, 76, between which is received the cylindrical wall or body 77. The said cup-shaped members receive the edges of the wall member 77 between them and the members of the respective pairs of cups are held together by rivets 77a, 77a and bearing bushings 78, 78.

Each of said magazines is also provided with a film-spool carrier 79 having a squared base 80 to engage a squared opening in the standard film spool 81 that receives the film 73. Each film-spool carrier 79 is provided with a collar integral with the carrier 79. The said collar also serves to align the film spool 81 correctly with relation to the other parts. Said collar also serves to prevent the film spool carrier 79 from passing through a hole in the magazine collar consisting in the present instance of the cup-shaped members 75, 76. The said film-spool carrier 79 has a reduced diameter 83, shown in Fig. 3, for passing through a hole in the magazine cover. A washer 84 is also fitted over the said reduced diameter 83 and provides means for holding the film carrier 79 to the magazine cover. The said film carrying member 79 has a further reduced diameter, over which rides a film take-up ratchet plate 86 and a ratchet tension spring 87. The said ratchet and spring are held in place by a thrust washer 88 staked to the film carrier 79. The film carrier 79 in the take-off magazine 63 is not provided with means for a take-up action, but is merely turned upon its stud 65.

The said magazines 63 and 64 are held in place on their studs 65 and 67 by means of projections 89 integral with the member 1 of the magazine-receiving portion of the housing. The structure of the said take-off and take-up magazines is sufficiently illustrated and described for purposes of explanation.

As most clearly shown in Figs. 1, 2 and 3, the said presser plate bar 70 is tensioned by means of a shoulder stud 90 thereon which is engaged by a spring 91 coiled about a shoulder stud 92 and held under tension by means of a second shoulder stud 93.

I provide means for feeding the film which is so associated in operation with the operation of the shutter and the furnishing of illumination that all parts of the camera function in unison and are intimately related in operation. For feeding the film indicated at 73 in Fig. 3, there is provided a film feed bar indicated generally at 95 (Figs. 1, 2 and 4), it having an operating stud 96 extending from a turned-down lip 96a. The said bar 95 is also provided with a spring stud 97 riveted thereto, and with two lengthwise extending slots 98, 99. With said film feed bar 95 cooperates a film take-up ratchet-pawl and film feed dogs (not herein fully shown).

Figure 4:
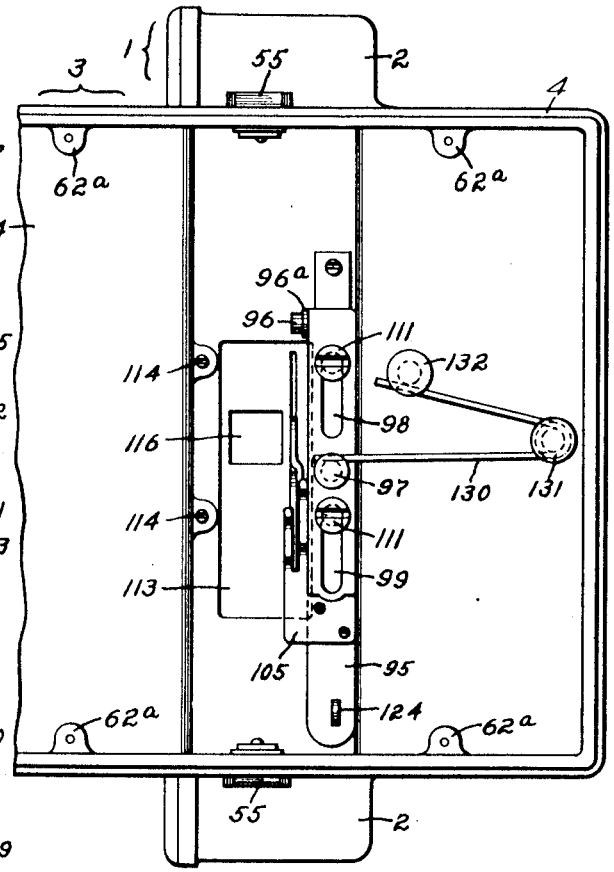
Fig. 4 is a front elevation of the camera having the shutter plate removed, and showing the film advancing bar and the exposure aperture, parts being broken away.

The said film feed bar 95 is mounted on studs in the said mechanism-housing part 3 by means of shoulder screws 111, 111 (shown in Fig. 4). The said shoulder screws 111, 111 also hold a film guide plate 112 (Figs. 1 and 2) and an aperture plate 113 (Fig. 4) in position upon the mechanism-housing part 3. The said guide plate and aperture plate are also held in place by means of screws 114, 114 (best shown in Fig. 4).

Inasmuch as the film feed bar 95 is provided with the lengthwise slots 98, 99 and rides on the shoulder screws 111, 111, it is free to receive a lengthwise movement within the limits of said slots 98, 99. This movement is a vertical one, viewing Fig. 4, where the relative position of the said feed bar with respect to the aperture plate 113 best appears.

As the feed bar 95 moves lengthwise or upward, viewing Figs. 1, 2 and 4, it carries with it the film advancing dogs, and as said feed bar is moved downward the film strip 73 (Fig. 3) is fed forward preferably to an extent slightly greater than one and a half spaces of perforations, thus providing a frame equal to one and a half spaces of film perforations.

On the next cycle of movement of the feed bar 95, the film feed dogs engage one of the film perforations and on the next downward movement of the feed bar 95 the film 73 would be caused to be moved a distance equal to one and a half times the spacing of the film perforations.

The said construction provides means whereby a standard perforated film may be used, such as indicated at 73, and yet I may obtain a spacing which will yield or provide for a dimension one and a half times greater than if the standard spacing of feeding were used.

In order to hold the film 73 in accurate alignment with the film guide plate 112, there is provided (as shown in Figs. 1 and 2) a presser shoe or plate 117 secured to the film presser plate bar 70 by a shoulder rivet 118. Between the said presser shoe 117 and the presser bar 70 is positioned a resilient member 119 of rubber or suitable composition. Thus the said shoe 117 is allowed in effect to float and to seek a proper level or position against the film 73, thereby holding said film in perfect contact with the film guide plate 112.

The said presser plate bar 70 is provided with an upturned end 120 (Figs. 1 and 2), to which the presser shoe 117 is attached, as stated, by said shoulder rivet 118. The opposite end of the film presser plate bar 70 is provided with a second upturned end 121 (Figs. 1 and 2), so that the operator may move the film presser plate bar 70 and the film presser shoe or plate 117 away from the film guide for purposes of loading. The film presser plate 70 is then returned to its proper position by the spring 91 (shown in Figs. 1 and 2).

The film 73 is fed by the feed dogs into the take-up magazine 64 through a suitable light trap and the film is taken up on the film spool 81 (Fig. 3), which is caused to turn to a slight extent for each cycle of movement of the film feeder bar 95.

Referring again to Figs. 1 and 2, it will be noted that the ratchet plate 86 is engaged by a pawl 122 attached to a bell crank lever 123 having an arm 124 pivoted on a shoulder rivet 125. The said pawl 122 is caused to move in a clockwise direction under the influence of a coil spring 126. A second or holding pawl 127 is mounted on a shoulder rivet 128 and is caused to turn in a clockwise direction under the influence of a spring 129. This structure prevents the ratchet plate 86 from turning in a contraclockwise direction.

The said lever arm 124 extends through a suitable slot of the film feed bar, as indicated in Figs. 1, 2 and 4. The said arm 124 is caused to move with the upward movement of the bar 95 sufficiently far to engage the radial edge of a tooth of the ratchet plate 86; thus for each cycle of movement of the film feed dogs, the ratchet plate 86 is turned one tooth.

Inasmuch as the take-up film spool 81 will be built up or increase in diameter as more film is wound thereon, means must be provided to compensate for the difference between the length of film that would be wound up and the amount of film that is actually fed off by the film dogs. To compensate for this situation, the ratchet plate 86 is mounted on the take-up member 83, as shown in Fig. 3, under the spring tension 87, thus allowing the said ratchet plate 86 to slip when the tension on the spool 81 reaches a certain definite point. Thus, while the ratchet plate 86 will always travel a distance of one tooth, the film spool will turn only far enough actually to take up the film that has been fed to it, thus providing a very simple take-up means.

The said film feed bar 95 is caused to be moved in an upward direction, viewing Figs. 1, 2 and 4, by the operator when he manually operates either the lever that is mounted on the hood when the camera is used for photorecording, as disclosed in my said parent application, or when he moves the operating rod-like member 214, shown in Fig. 9 and hereinafter referred to, when the camera is used as a copying camera. The said film feed bar 95 is moved in a downward direction (viewing Figs. 1, 2 and 4) by a spring 130 (shown in Fig. 4) as passing around a shoulder rivet 131 and as held under tension by a shoulder rivet 132 engaging the end portion of the said spring.

Figure 5:
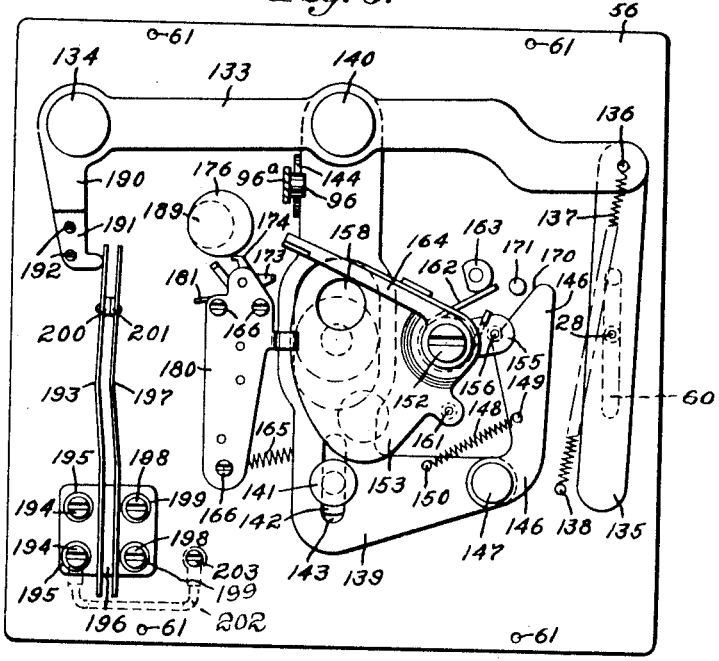
Fig. 5 is a plan view of the shutter operating mechanism, the shutter operating lever being represented as in its position of operation just prior to an exposure.
Figure 6:
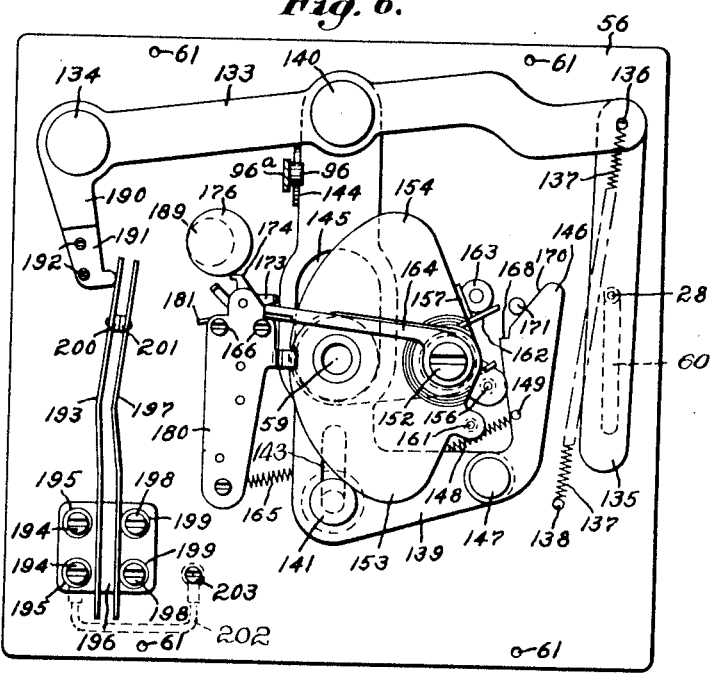
Fig. 6 is a plan view similar to Fig. 5, but representing the shutter release lever as having been operated, the first shutter leaf having been released and the second shutter leaf having been retarded by the slow-shutter-speed mechanism.

I will now describe the shutter mechanism, and for that purpose will refer particularly to Figs. 5, 6, 7 and 8. In Figs. 5 and 6 is shown a lever 133 attached to the shutter plate 56 by means of a shoulder rivet 134. To the opposite end of lever 133 is attached a sliding plate or arm 135 by means of a rivet 136 and attached to the said sliding plate or arm 135 is the operating pin 28, previously referred to.

The said lever 133 is caused to move in a clockwise direction under the influence of the coil spring 137 attached to the rivet 136 and to a pin 138 on the shutter plate 56. The pin 28 is connected to the means provided for releasing the shutter and feeding the film (in this embodiment of my invention shown in Fig. 9) so that any motion of the pin 28 is transmitted to the said lever 133.

To the said lever 133 is attached an L-shaped, pivoted lever-member 139 by means of a shoulder rivet 140. The lever-member 139 is guided on the shutter plate 56 by means of a shoulder rivet 141 and is suitably spaced therefrom by a spacing washer 142. The said lever-member 139 is provided with a longitudinal slot 143 which allows said arm 133 to be moved upon its pivot 134 to an extent equal to the length of the slot 143. The said lever-member 139 is provided with an upturned lip or prong 144 near the extreme left hand end thereof. The said prong 144 engages the pin 96 of the film feed bar 95 (Figs. 5 and 6).

Thus, any movement imparted to the pin 28 by movement of the shutter-operating and film-feeding member hereinafter referred to is transmitted to the feed-operating bar 95 and causes film to be fed. The said lever-member 139 is also provided with a second larger slot 145 for the purpose of clearing the lens 59. Attached to the outer end of the said lever-member 139 is a shutter-operating lever-arm 146, attached to said lever-member 139 by a shoulder rivet 147. The said lever-arm 146 is caused to turn in a contraclockwise direction by means of a coiled spring 148 that is connected to a pin 149 on said lever arm 146 and to a pin 150 attached to the lever-member 139.

Figure 7:
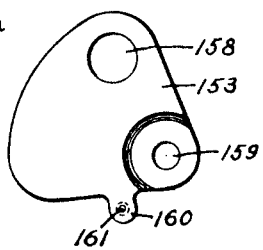
Fig. 7 is a side elevation of the second shutter leaf.
Figure 8:
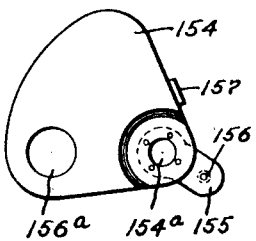
Fig. 8 is a side elevation of the first shutter leaf.

The said shutter plate 56 is provided with a boss 151, most clearly shown in Figs. 1 and 2. Riding upon a shoulder screw 152 threaded on the said boss 151 are shutter leaves or blades 153, 154 (separately shown in Figs. 7 and 8 respectively). As shown in Figs. 5 and 6, the shutter leaf 153 overlies the shutter leaf 154. The said shutter leaf 154 is provided with an arm 155 having a pin 156, as best indicated in Fig. 8. The shutter leaf 153, as best shown in Fig. 7, has a hole 159 providing a pivot for the shutter leaf on the shoulder screw 152 and the shutter leaf 154 has also a hole 156a for admitting light to the lens and is also provided with an upturned lip 157. The shutter leaf 153 is provided with a hole 158 to admit light to the lens 59 and a second hole 159 affording a pivot for the said shutter leaf 153 on the shoulder screw 152. The shutter leaf 153 has a laterally extending lip 160 provided with a pin 161. Around the boss 151 (best shown in Figs. 1 and 2) is placed a spring 162, one end whereof rests against the shutter stop 163. The other end of the said spring 162 is hooked around the shutter leaf extension, thus causing the said shutter leaf 154 to turn in a clockwise direction until the said lip 157 engages the stop 163. The upper shutter leaf 153 is also provided with a flexible arm 164 that extends from the pivot thereof, as clearly indicated in Figs. 5 and 6. The said arm 164 is caused always to travel with the shutter leaf 153. A spring 165 is attached to the pin 161 of the shutter leaf 153 and to a screw 166 of the slow-shutter-speed mechanism, so as to cause the shutter leaf 153 to turn in a clockwise direction until the foremost end of the said shutter leaf 153 engages the stop 157 of the shutter leaf 154.

If the pin 28 (shown in Figs. 5 and 6 as in the slot 60) is caused to move in an upward direction viewing said figures, it carries with it the lever arm 133, so that the same moves in a contraclockwise direction viewing said figures, and therefore moves upward the said L-shaped lever-member 139 with the shutter operating member 146, whereupon a notch 168 in the edge of the shutter operating member 146 (as indicated in Fig. 6) will engage the pin 156 of the shutter leaf 154, thereby causing it to turn in a contraclockwise direction. The shutter leaf 153 will also be caused to travel in a contraclockwise direction under the influence of the upturned lip 157 of the shutter leaf 154, as indicated in Fig. 5.

The arm 164 of the shutter leaf 153 will engage a dog 169 of the slow-shutter-speed mechanism, thus momentarily holding the opening 158 of the shutter leaf 153 over the lens 59. As the motion of lever arm 133 is continued in a contraclockwise direction, viewing Figs. 5 and 6, the cam face 170 at the outer end of the shutter-operating member 146 will ride up on a pin 171 extending from the face of the shutter plate 56, so as to disengage the notch 168 of the said shutter-operating member 146 from the pin 156, thus allowing the shutter leaf 154 to return to the starting position. At such time the hole 158 of the shutter leaf 153 registers with the lens 59, and inasmuch as the shutter leaf 153 is at such time held up by the slow-shutter-speed mechanism, the said lens in lens barrel 59 will be uncovered, the shutter operating parts being then in the position shown in Fig. 6, and exposure is made. The operator may continue to hold the shutter operating member until the shutter is closed, which action is signified by an audible signal or click.

The shutter retarding mechanism is not herein shown in entire detail, but there is provided a gear sector having, as indicated in Figs. 5 and 6, an arm 173 having an upturned end constituting a retarding dog. Such gear sector is provided with a second arm 174 having an inclined face adapted to be engaged by the slow-speed timing cam 176 (shown in Figs. 5 and 6), which need not be referred to in greater detail. There is provided a cover 180 for the slow-shutter-speed mechanism.

Making reference now to Fig. 6, it will be observed that the shutter leaf 153 has returned to its starting position, thus uncovering the lens 59. The shutter leaf 154 is at such time being held in a position in which its opening 156a registers with the lens 59, thus uncovering the same. Inasmuch as the shutter leaf 154 is under tension of the spring 148, the shutter leaf 154 will move in a clockwise direction, carrying with it the arm 164 that, as previously stated, engages the upturned end or dog 169 of the arm 173 of the gear sector 172. The slow-shutter-speed mechanism is caused to operate, thus allowing said arm 173 to turn slowly in a contraclockwise direction until the said upturned end or dog 169 becomes disengaged from the shutter leaf arm 164, thus allowing the shutter leaf 154 to close.

The operator now returns the shutter-operating and film-feeding member to its initial position, and the slow-shutter-speed mechanism is caused to be restored to its initial position.

There will next be described the means whereby, through the operation of the shutter-mechanism and the film-feeding mechanism, illumination is provided while an exposure is being made, and in so doing reference will be made to Figs. 5 and 6.

The lever member 133 is provided with an L-shaped end 190 having attached thereto a part or member 191 of insulating material by means of screws 192, 192. Attached to the shutter plate 56 is a long, contact, spring arm 193 held to the shutter plate 56 by screws 194, 194, it being insulated therefrom by insulating bushings 195, 195 and an insulating plate 196. A second long, contact, spring member 197 is provided and is held to the shutter plate 56 by screws 198, 198 and is insulated from the shutter plate 56 by insulating bushings 199, 199. The contact spring member 193 is provided with a contact point 200 and the contact spring member 197 is provided with a contact point 201.

When the shutter mechanism is operated as hereinbefore described, the said arm 190 of the lever-member 133 turns in a contraclockwise direction and the insulated part or member 191 pushes the spring contact member 193 carrying with it the contact point 200 until the latter touches the contact point 201 of the contact spring member 197, thus completing the lighting circuit. The said contact spring member 193 is connected to the shutter plate 56 by means of a wire 202 and is grounded thereto by means of a suitable screw 203. The contact spring member 197 is connected to the battery or batteries through one of the screws 199, etc.

The film magazine 63 (best shown in Fig. 3) is placed in the camera and the film 73 is threaded through the film gate 112 and then led into the take-up magazine 64. The cover member 1 is replaced on the receptacle 2 (it having been removed for the introduction of the film and the threading up thereof), and the shutter-operating and film-feeding member may be worked back and forth by the operator several times so that an unexposed area of film strip is certainly before the exposure aperture.

Reference is now made to Figs. 9, 10 and 11, wherein the camera body consisting of the parts 1, 2 and 3, but without the hood structure (which is used only when photorecording and which therefore leaves the camera structure as shown in Figs. 1 and 2) is placed on a suitable camera support mounted on legs, which will be specifically described.

It is often desirable to have means for photographing records such as letters, pages of books or labels on a package, economically. By my invention I have provided a camera that uses a very economical film and thirty pictures can be made on each foot of film. It will be understood that the cost per picture would be a small fraction of a cent. Since the camera is so economical to operate, a great number of objects will, in the use of the invention, be photographed therewith that ordinarily would not be photographed because of the high cost, as, for instance, all incoming mail in a business institution, or the labels on all outgoing packages in large department stores, or the weight as read on the dial of scales that are often used in weighing out ingredients in manufacturing processes.

I have disclosed means for connecting the illumination means with the regular electrical supply that is usually available in the places in which this camera would normally be operated.

To adapt the camera disclosed in Figs. 1 to 8 to the new use just referred to, I have provided a casting 210, shown in section in Fig. 9 and herein designated as a camera support. It has a bottom wall 211 and an opening 212 through which the light rays can pass to the lens 59. Also attached to the bottom wall 211 is a boss 213 which supports an operating rod 214 (also shown in Fig. 10). Said operating rod 214 has a flat rectangular section which passes through one wall of the camera support 210 and through a hole provided in the rod support 213. Attached to the left-hand end 214 (Fig. 9) is an operating button 215. On the opposite end of rod 214 is provided a hole 216 which receives the operating pin 28 previously described.

It will be apparent that when the operating button 215 is pushed to the right, viewing Fig. 9, said pin 28 will be caused to move to the right, thus operating the shutter, and on its return stroke, it will advance the film as previously described. The camera support 210 has integral therewith four bosses 217. Only two of these bosses are shown in Fig. 9. Into said four bosses 217 are fitted four legs 218, of which two are shown. The four legs 218 are made of sufficient length to hold the camera the proper distance from the object to be photographed. Attached to the camera support 210 are lamp brackets 219, 219 by means of bolts 220, 220 and to said lamp bracket 219, 219 are attached the usual electric lamp sockets 221, 221 by means of clamping nuts 222, 222. The usual connecting wires 223, 223 are connected to the sockets. Into the sockets 221, 221 are fitted lamps 224, 224. Two or more of these lamps are usually provided. The lamps 224, 224 are connected in parallel (shown in Fig. 11) wherein one wire 225 from the supply is connected with sockets 221, 221. One socket is connected directly, and the second socket is connected by a short wire 226. The other wire 227 from the supply is connected to terminal 199 of the switch built into the camera, as previously described, and connected with the terminal 195 of said switch is a wire 228 which directly connects one of the sockets 221, and the other socket 221 is connected by a short jumper 229 (Fig. 11).

The camera mechanism is held in the camera support 210 by any type of clamping means, such as a screw passing through the camera support 210 into the camera housing flange 4, or when the mechanism is used in a vertical position, gravity alone would be sufficient to hold the camera in place. The camera operating bar 214 is permanently attached to the camera support 210 as previously described. The camera mechanism housing can be readily lifted off the support 210 and as readily replaced, it being necessary only to pull the operating button 215 to the left until the hole 216 engages and receives pin 28, and then the camera mechanism can be clamped to said camera support 210, and by connecting the electrical supply the camera is ready to operate.

The disclosed embodiment of my invention provides a camera that can be very economically manufactured and can be readily taken apart and stored away in a very small space. It is also very simple in its operation; in fact, any employee of an ordinary office or factory could operate the camera after having only a few minutes of instruction. The camera will, of course, photograph anything over which it is placed, as, for instance, incoming mail could all be photographed and at the same time the face of a watch or clock could be placed along side of the matter to be photographed and a record could be kept of the exact time the photograph was made. This is a very valuable feature in photographing packages in the act of being delivered from a department store, where it is often desirable to have means of telling just when a package left the shipping room. In this invention I have provided such means.

I have not shown a clock, because the photographing of clocks is well known in the art. The present camera can be used for any such type of photographing. It will be apparent that the camera mechanism, as removed from the stand just above described, can also be used for a number of other purposes by merely providing suitable brackets to hold the camera the proper distance from the object to be photographed and supplying an illuminating source and means for operating the said pin 28.

The camera is relatively light in weight and is not equipped with a motor for operating the shutter and feeding the film, as shown in the said Patent No. 1,963,095 issued to myself and William H. Petit. Moreover, standard film is preferably used in the camera, and the camera can be very quickly loaded and unloaded in daylight.

It will be understood from the foregoing description that the magazines-receiving structure consists of a box-like film-receiving member and a cover member adapted to receive between them a film take-off magazine and a take-up magazine; that there is provided a mechanism-housing rigid with and laterally extending from the said box-like film-receiving member; that there is provided a shutter and shutter-operating means and film-feeding means within the said mechanism-housing; and that there is provided manually operable means for conjointly operating said film-feeding means and said shutter-operating means, said manually operable means including the operating rod 214 operatively connected to the shutter to operate the same in one direction of movement and operatively connected to the film-feeding means to operate the latter in its other direction of movement.

The camera-support has, as shown, a tray-like substantially flat portion adapted to have the camera directly and readily applied thereto and readily removed therefrom. The said tray-like portion has mounted therein the camera operating means for manual manipulation by the operator, which means is adapted to be readily connected to and disconnected from a camera operating member within the camera, which member operates the shutter and feeds the film. The connection is made through or by the pin 28 to the rod-like member 214 mounted in the camera support.

Having thus described one illustrative embodiment of the invention, it is to be understood that although specific terms are employed, they are used in a generic and descriptive sense, and not for purposes of limitation, the scope of the invention being set forth in the following claims.

I claim:

1. A copying camera unit for photographing still records, such as letters, pages of books, etc., placed flatwise in a still condition on a horizontal base below the downwardly pointed camera, comprising, in combination: a camera support having manually-operated camera-operating means, said camera support comprising a tray-like, substantially flat portion adapted to have the camera directly and readily applied thereto with the lens of said camera pointed downward, said tray-like portion for that purpose being open below the lens of the camera when so positioned, said camera support having an upright leg or legs to support said tray-like portion thereof substantially above the base whereon the letters, books or the like to be photographed are placed in a still condition; said tray-like portion having mounted therein camera operating means for manual manipulation by the operator, and which manually-operable means for that purpose is readily connectable to and disconnectable from a camera-operating member of the camera that operates the shutter and feeds the film; a compact photographic camera adapted, as stated, to be received directly upon said camera support with the camera lens directed downwardly and the said camera operating member positioned so as to be accessible for ready connection to and disconnection from said camera-operating means; said camera having a mechanism-housing and having shutter and shutter operating means mounted within said mechanism-housing and also having film-feeding means mounted within said mechanism-housing, said camera having within said mechanism-housing the said camera operating member which is operatively connected to said shutter operating means and said film-feeding means.

2. A copying camera unit in accordance with claim 1, but wherein the said camera operating means is a rod 214 mounted for manual axial operating movement in the said tray-like portion and which rod 214 is detachably connected to the said camera operating member.

3. A copying camera unit in accordance with claim 1, but wherein the said tray-like portion of the camera support is provided with clamping means for securing the said camera in functioning position therein.

4. A copying camera unit in accordance with claim 1, but wherein the said mechanism housing is provided with an outer, substantially rectangular rim 4 adapted to be received by a wall-like formation of the camera support.

5. A copying camera unit comprising, in combination, a camera having means to support a film, having film feeding means, having a shutter with operating means, and also having a movable member operatively connected to said film feeding means and said shutter operating means, so that by movement of said member the shutter is operated and the film is fed for the next exposure; and a camera support for, but structurally distinct from, said camera and to which the camera may be applied by the operator so as to be supported in functioning position above still letters, books or the like, with the lens of the camera pointed downward toward the same, said camera support comprising a tray-like, substantially flat portion adapted to have the camera directly and readily applied thereto and readily removed therefrom, with the lens of said camera pointed downward, said tray-like portion for that purpose being open below the lens of the camera when so positioned, said camera support having an upright leg or legs to support said tray-like portion thereof substantially above the base wherein the letters, books or the like to be photographed are placed in a still condition; said tray-like portion having mounted therein camera operating means for manual manipulation by the operator, and which means for that purpose is adapted to be readily connected to and disconnected from a camera-operating member of the camera.

6. A copying camera unit in accordance with claim 5, but wherein the said camera support is provided with electric lighting means mounted thereon and adapted to be connected to an outside source of current, and also connected with electric-circuit insulated-bushing terminals and an electric switch of the camera, and wherein the said camera operating member also acts to close the said electric switch and thereby to cause said electric lighting means to function.

7. A copying camera unit in accordance with claim 5, but wherein the said camera operating means is a rod 214 mounted for manual axial operating movement in the said tray-like portion and which rod 214 is detachably connected to the said camera operating member.

8. A copying camera unit in accordance with claim 5, but wherein the said camera operating member is a pin 28 and which is mounted in the camera so as to be moved to and fro and which, when the copying camera unit is assembled, is moved to and fro by manual movement of the said camera operating means, so that by movement in one direction it operates the shutter and causes the electric lighting means to function and by return movement in the opposite direction feeds the film in the camera.

EDSON S. HINELINE.